United States Patent
Tiesler

(10) Patent No.: US 6,733,034 B2
(45) Date of Patent: May 11, 2004

(54) MODULAR HEADLINER ASSEMBLY WITH AIR CURTAINS

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/149,523

(22) PCT Filed: Dec. 15, 2000

(86) PCT No.: PCT/US00/34097
§ 371 (c)(1), (2), (4) Date: Jun. 10, 2002

(87) PCT Pub. No.: WO01/44027
PCT Pub. Date: Jun. 21, 2001

(65) Prior Publication Data
US 2002/0190506 A1 Dec. 19, 2002

Related U.S. Application Data
(60) Provisional application No. 60/172,395, filed on Dec. 17, 1999.

(51) Int. Cl.[7] .............................................. B60R 21/22
(52) U.S. Cl. .................................. 280/730.1; 280/730.2
(58) Field of Search .............................. 280/730.1, 730.2

(56) References Cited

U.S. PATENT DOCUMENTS

| | | | | |
|---|---|---|---|---|
| 5,602,734 A | * | 2/1997 | Kithil | 701/45 |
| 5,775,726 A | * | 7/1998 | Timothy et al. | 280/730.1 |
| 5,921,575 A | | 7/1999 | Kretschmer et al. | |
| 5,988,735 A | | 11/1999 | Muller | |
| 6,070,902 A | * | 6/2000 | Kowalski et al. | 280/730.2 |
| 6,102,435 A | * | 8/2000 | Wallner et al. | 280/730.2 |
| 6,103,984 A | * | 8/2000 | Bowers et al. | 280/730.2 |
| 6,106,007 A | | 8/2000 | Kretschmer et al. | |
| 6,135,491 A | | 10/2000 | Olson et al. | |

FOREIGN PATENT DOCUMENTS

| | | |
|---|---|---|
| DE | 198 15 381 A1 | 10/1999 |
| EP | 0 836 970 A1 | 4/1998 |
| EP | 0 962 364 A1 | 12/1999 |

* cited by examiner

Primary Examiner—Charles T. Jordan
Assistant Examiner—Bret Hayes
(74) Attorney, Agent, or Firm—Bill C. Panagos

(57) ABSTRACT

A headliner and air bag assembly includes a headliner having a left and right side edges and a carrier assembly having left and right rails extending along the left and right side edges of the headliner, respectively. The carrier assembly also includes a cross-member connecting the left and right rails. The left and right rails support at least one air bag assembly, and the carrier assembly provides structural support for the headliner and for the air bag assembly to prevent bending of the headliner during installation.

20 Claims, 4 Drawing Sheets

MODULAR HEADLINER ASSEMBLY WITH AIR CURTAINS

CROSS REFERENCE TO RELATED APPLICATION

This application is the National Stage of International Application No. PCT/US00/34097, filed Dec. 15, 2000. which claims the benefit of U.S. Provisional application Ser. No. 60/172,395, filed Dec. 17, 1999.

TECHNICAL FIELD

The present invention relates to a vehicle headliner assembly including a carrier assembly which supports at least one air curtain on the headliner and adds structural integrity to the headliner assembly.

BACKGROUND OF THE INVENTION

Modularity in vehicle components is important for auto manufacturers because it simplifies the auto assembly process, thereby reducing parts. Recently, automotive interior headliners have been made modular by providing a headliner subassembly which includes overhead consoles, electronics, light sources, air curtains, and air curtain deployment equipment mounted on the headliner. The headliner and these various components are installed as a single unit subassembly into a vehicle.

One problem with the modularity concept in headliners is that the attachment of various heavy components around the periphery of the headliner may cause flexing or bending of the headliner, which can make handling and assembly difficult.

DISCLOSURE OF INVENTION

The present invention overcomes the problem described above by providing a carrier assembly which is adhesively secured to the periphery of the headliner for supporting the air bag system and adding structural integrity to the headliner subassembly for installation in the vehicle. The air bag igniter is mounted to the rear of the headliner so that it need not be mounted behind an overhead console.

More specifically, the present invention provides a headliner and air bag assembly including a headliner having left and right side edges. A carrier assembly includes left and right rails extending along the left and right side edges of the headliner, respectively, and a cross-member connecting the left and right rails. The left and right rails support at least one air bag assembly, and the carrier assembly is configured to provide structural support for the headliner and for the air bag assembly. Preferably, the carrier assembly is adhesively secured to the periphery of the headliner.

Another aspect of the invention provides a method of assembling a vehicle headliner and air bag assembly including the steps of: a) providing a plastic carrier assembly including left and right rails and a cross-member; b) positioning inflatable air curtains within the left and right rails; c) positioning an igniter assembly in the cross-member for deploying the air curtains; and d) attaching the carrier assembly to a headliner having left and right side edges such that the left and right rails extend along the left and right side edges, and the cross-member connects the left and right rails to structurally support the weight of the headliner and air bag assembly during installation.

Accordingly, an object of the invention is to provide a modular headliner assembly including a carrier assembly which supports the weight of the headliner and of various heavy components attached around the periphery of the headliner, such as the air curtains and inflator assembly, to prevent flexing or bending of the headliner during installation.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
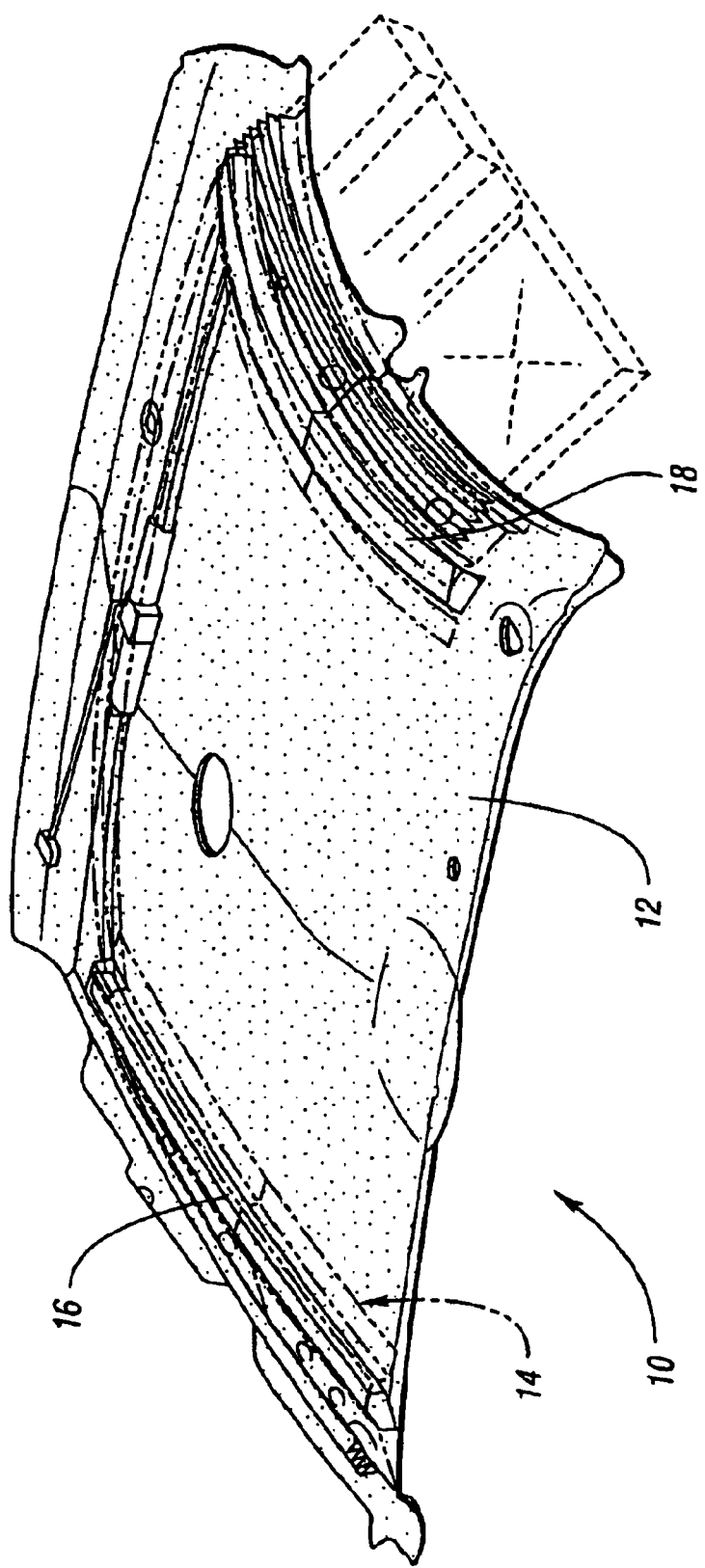
FIG. 1 shows a perspective view of a headliner and air bag assembly in accordance with the present invention.
Figure 2:
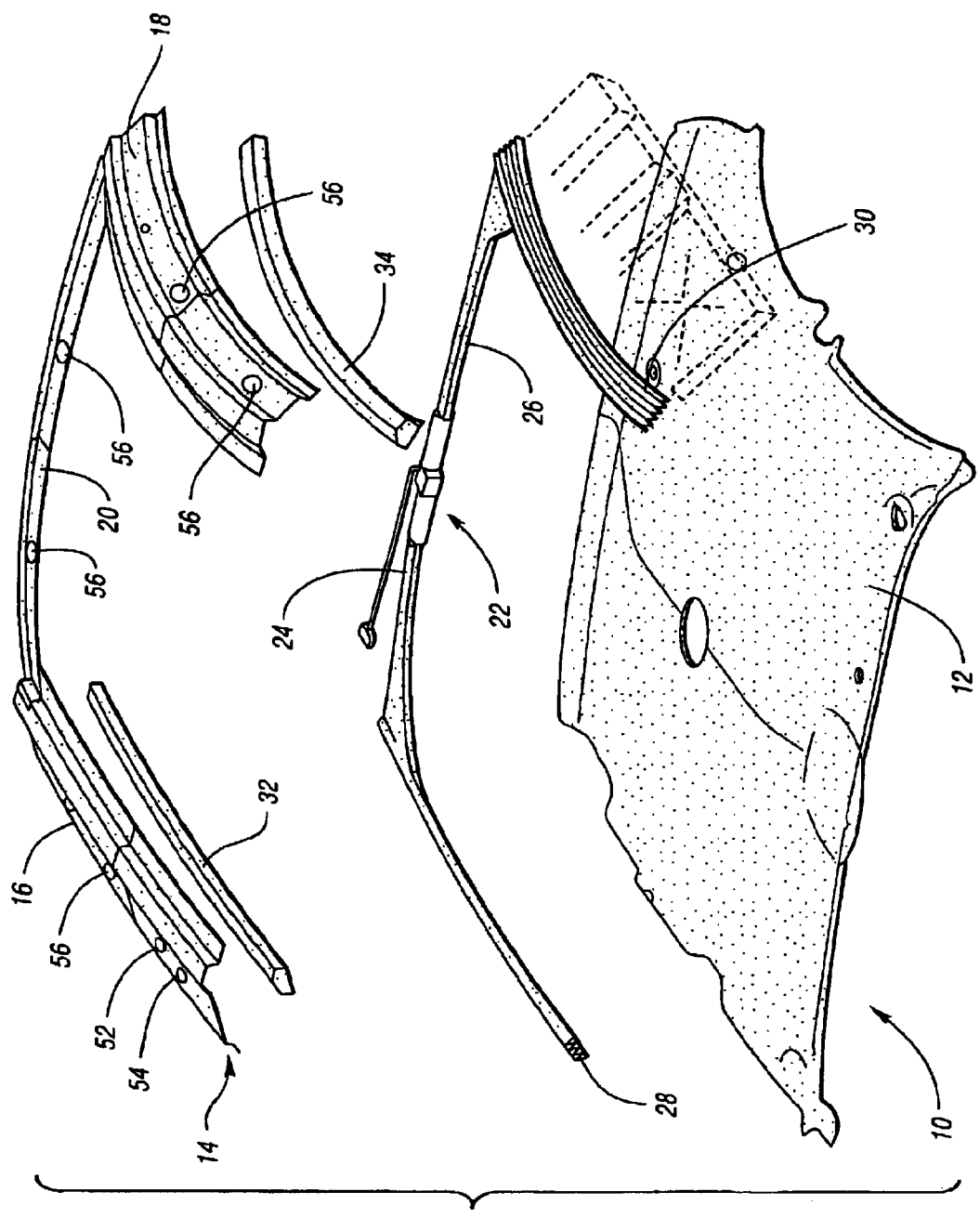
FIG. 2 shows an exploded perspective view of the assembly of FIG. 1.

FIGS. 1 and 2 show a headliner and air bag assembly 10 in accordance with the present invention. The headliner and air bag assembly 10 includes a headliner 12, which is typically a PET, or other thermoformable material. A plastic carrier 14 includes left and right rails 16,18, and a rear header 20 which is attached, such as by sonic welding, between the left and right rails 16,18 to form the carrier 14.

An igniter assembly 22, which includes a canister and inflator, is secured to the rear header 20, and polypropylene or canvas tubes 24,26 extend from the igniter assembly 22 for deploying the air curtains 28,30.

The air curtains 28,30 are housed within the left and right rails 16,18, along with EPP foam countermeasures 32,34 for head impact protection. The air curtains 28,30 are configured for deployment along the side windows of a vehicle.

Once the countermeasures 32,34 and air curtains 28,30 have been assembled into the left and right rails 16,18, a layer of scrim could be placed over this carrier subassembly to assure that debris does not inadvertently fall into the air curtain area.

Figure 3:
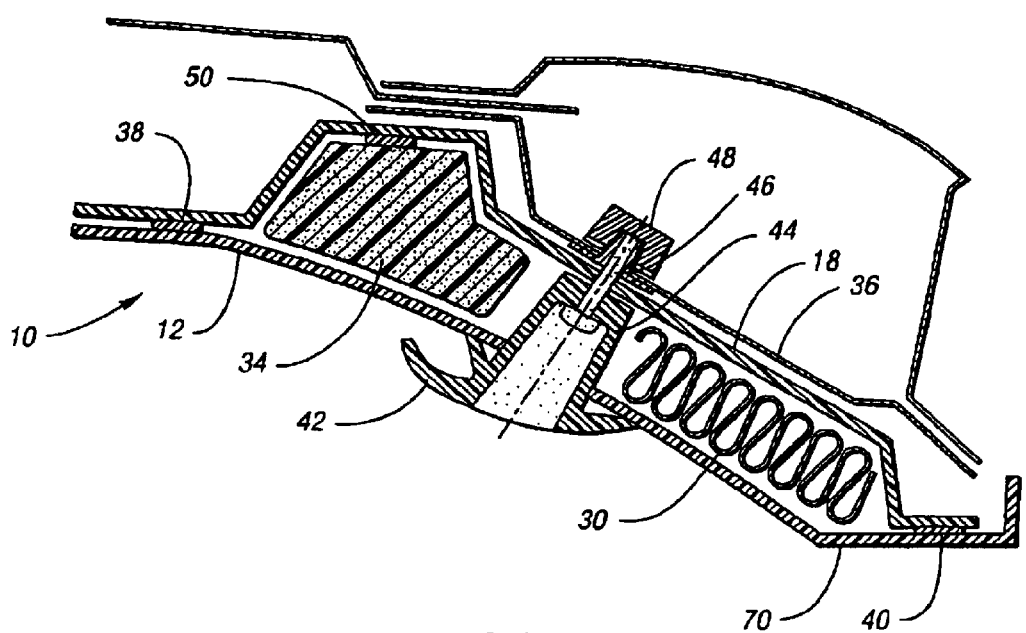
FIG. 3 shows a partial schematic cross-sectional view of the headliner and air bag assembly of FIG. 1 installed in a vehicle.

FIG. 3 shows a vertical cross-sectional view of the headliner and air bag assembly 10 secured to a vehicle roof structure 36. As shown, the headliner 12 is secured to the carrier 18 by hot melt adhesives 38,40. Preferably, the hot melt adhesives 38,40 comprise adhesive number HM7239 from Bostik Hot Melt Adhesives of Middleton, Mass.

As shown, a coat hook 42 includes a base 44 with a bolt 46 and Z-clip 48 which secure the carrier 18 to the headliner 12 to form a headliner subassembly which is installed into the vehicle simply by pushing the Z-clips 48 into the openings formed in the roof structure 36.

As shown in FIG. 3, hot melt adhesive 50 also secures the countermeasure 34 to the carrier 18.

In this manner, the coat hook 42 holds the portion of the headliner 12 shown in FIG. 3 to the carrier 18 for handling. The coat hook 42 is illustrative, and may be replaced by a grab handle or assist handle. For example, as shown in FIG. 2, apertures 52,54 are provided in the left rail 16 at a location in which a grab handle would be provided. The grab handle would be provided with a similar structure as the bolt 46 and Z-clip 48 shown in FIG. 3 for attachment to the headliner 12. Of course, multiple coat hook and assist handle attachments could be used throughout the assembly to secure various portions of the rails 16,18 to the headliner 12 to provide structural integrity to the assembly 10.

Figure 4:
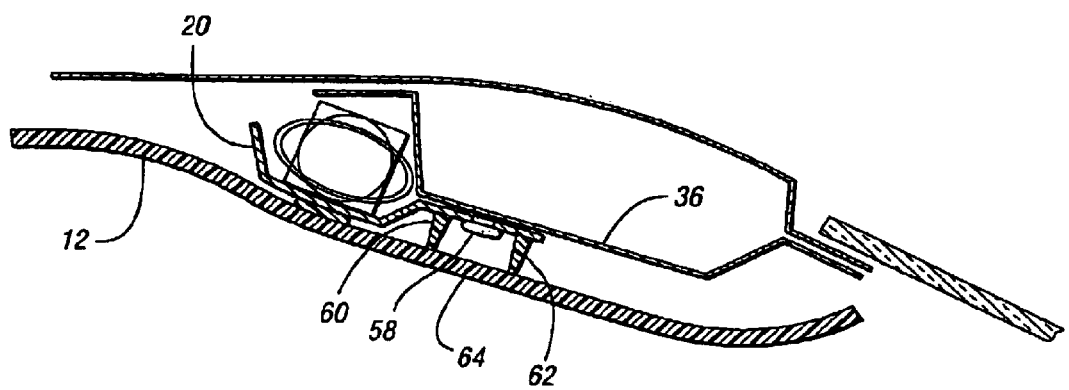
FIG. 4 shows a partial vertical cross-sectional view taken through the rear header of the headliner and air bag assembly of FIG. 1.

As shown in FIG. 2, Forrester fastener locations 56 indicate the presence of a Forrester fastener, shown in FIG. 4. FIG. 4 shows a vertical cross-sectional view taken through the rear header 20, and indicates one of several Forrester fasteners 58 which are secured about the periphery of the carrier 14. Preferably, the Forrester fastener is a pump fastener from Forrester Fastener Company of Clinton Township, Mich. The adhesive in the fastener is preferably an ethyl cyanoacrylate, such as adhesive #1414 from Loctite Company of Rocky Hill, Conn. Also, each Forrester fastener 58 includes stand-offs 60,62 on opposing sides thereof for transferring forces from the headliner 12 to the fastener 58. Forrester fasteners are configured with a plunger arrangement and include glue therein, such that when the plunger is depressed the glue is dispensed for attaching the carrier 20 to the roof structure 36. When the operator pushes on a marked location 64 (a location marker such as a sticker would be placed on the headliner 12), the forces would be transferred through the stand-offs 60,62 to the Forrester fastener 58 so that attachment glue is dispensed to secure the carrier 20 to the roof structure 36. These Forrester fasteners 58 would be positioned at each Forrester fastener location 56 illustrated in FIG. 2 for attachment to the roof structure 36 of the vehicle.

Figure 5:
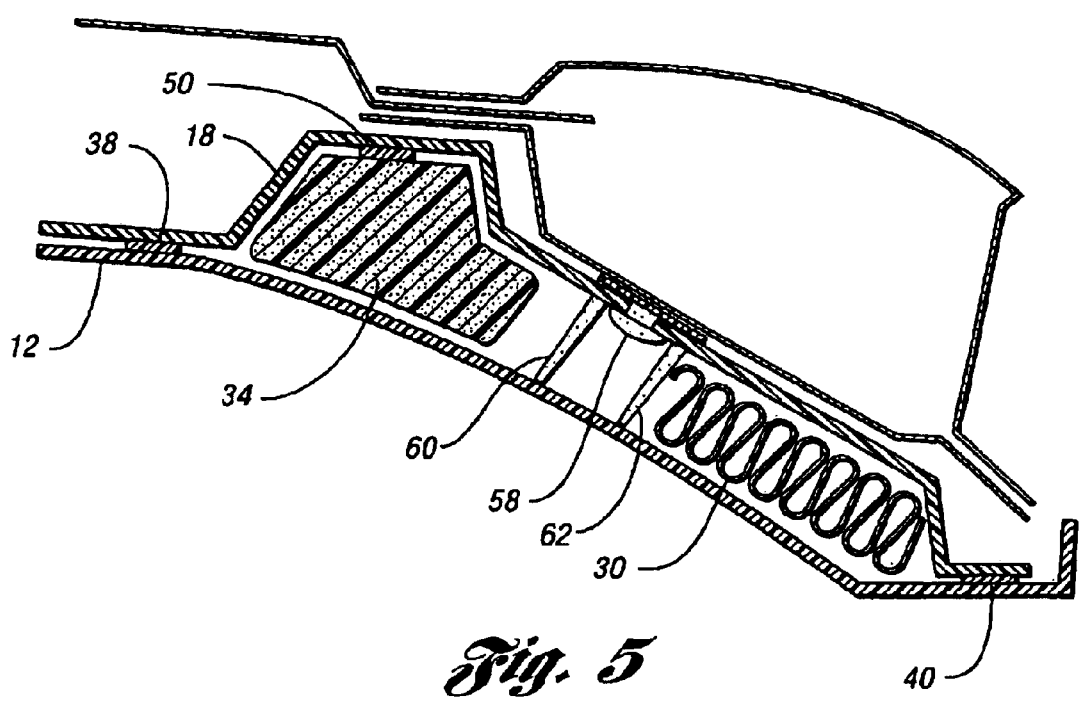
FIG. 5 shows a partial vertical cross-sectional view of the assembly of FIG. 1 attached to a vehicle, the section being taken through one of a plurality of Forrester fasteners in the assembly.

FIG. 5 shows a cross-sectional view taken through one of the Forrester fastener locations 56 in the right rail 18. As shown in FIG. 5, stand-offs 60,62 are provided for transferring forces from the headliner 12 to the Forrester fastener 58, as described above with reference to FIG. 4, for dispensing glue to attach the headliner to the vehicle roof.

Figure 6:
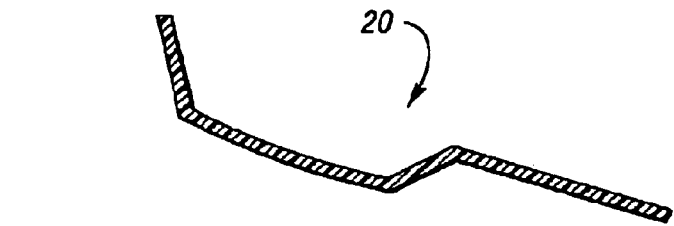
FIG. 6 shows a partial cross-sectional view of a rear header in accordance with the invention.
Figure 7:
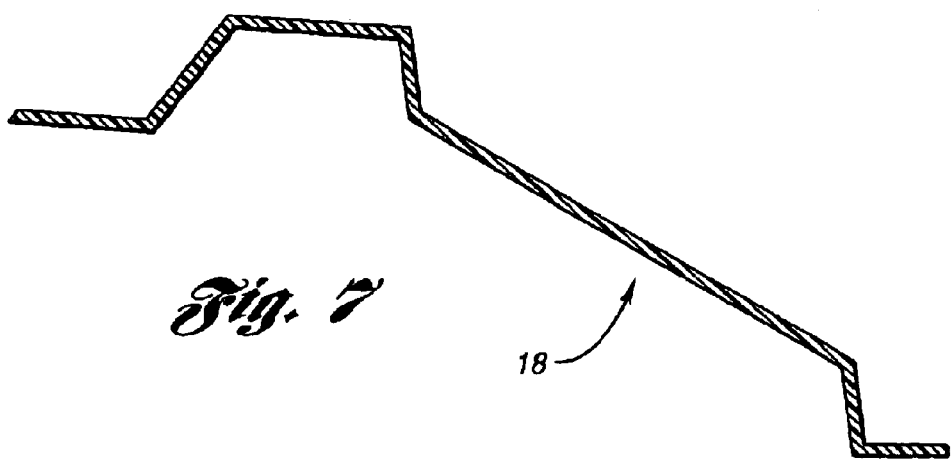
FIG. 7 shows a partial vertical cross-sectional view of a side rail in accordance with the present invention.

Turning to FIG. 6, a vertical cross-sectional view is shown of the rear header 20, and FIG. 7 shows a vertical cross-sectional view of a right rail 18. These components are preferably ABS plastic materials.

A subassembly including the carrier 14 and the air bag assembly including the igniter assembly 22, tubes 24,26, and air curtains 28,30, as well as the countermeasures 32,34 are attached to the headliner 12 in a nesting fixture with the hot melt adhesive 38,40.

When the air curtains 28,30 deploy, the hot melt adhesive 40 tears away from the headliner 12 (such as by tearing a scrim backing off of the headliner 12), 50 that the peripheral edge 70 of the headliner 12, shown in FIG. 3, displaces downward to provide clearance to enable deployment of the air curtains 28,30 along the vehicle side windows.

Also, by mounting the igniter assembly 22 in the rear of the headliner assembly, the need for housing the igniter assembly underneath the console is eliminated, thereby maximizing the usable space behind the overhead console.

While the best mode for carrying out the invention has been described in detail, those familiar with the art to which this invention relates will recognize various alternative designs and embodiments for practicing the invention within the scope of the appended claims.

What is claimed is:

1. A headliner and air bag assembly comprising:
   a headliner having left and right side edges and a periphery;
   a carrier assembly having left and right rails extending along the left and right side edges of the headliner, respectively, and a cross-member connecting the left and right rails;
   said left and right rails supporting left and right air curtains respectively, and said carrier assembly being configured to provide structural support for the headliner and for said air bag curtains to prevent bending of the headliner during installation; and
   wherein an igniter assembly is provided for inflating the left and right air curtains of said airbag assemblies; characterized in that
   said left and right air curtains are housed within said left and right rails, respectively, said igniter assembly being supported by the cross-member and in that said carrier assembly is adhesively secured to the periphery of the headliner such that upon inflation of said left and right air curtains the adhesive attachment along the left and right side edges of the headliner is torn to enable deployment of said left and right air curtains.

2. The headliner and air bag assembly of claim 1, wherein said carrier assembly comprises injection molded plastic.

3. The headliner and air bag assembly of claim 1, further comprising foam countermeasures supported by said left and right rails.

4. The headliner and air bag assembly of claim 3, further comprising a layer of scrim enclosing the air curtains and foam countermeasures within the left and right rails.

5. The headliner and air bag assembly of claim 1, further comprising a vehicle interior utility component securing the carrier assembly to the headliner.

6. The headliner and air bag assembly of claim 5, wherein said utility component comprises a coat hook assembly.

7. The headliner and air bag assembly of claim 1, wherein said carrier assembly includes at least one pump fastener for selectively dispensing adhesive to secure the carrier assembly to a vehicle roof.

8. The headliner and air bag assembly of claim 7 wherein said carrier assembly includes standoffs on opposing sides of the pump fastener for transferring forces from the headliner to the pump fastener.

9. The headliner and air bag assembly of claim 1, wherein said headliner has front and rear edges and said carrier assembly is U-shaped such that said cross-member extends along said rear edge of the headliner.

10. The headliner and air bag assembly of claim 1, wherein said left and right rails each contain at least one cavity for housing said left and right air curtains, respectively.

11. The headliner and air bag assembly of claim 1, wherein said carrier assembly is adhesively secured to a substantial portion of the periphery of said headliner.

12. The headliner and air bag assembly of claim 1, wherein said igniter assembly is disposed between said headliner and said carrier assembly.

13. The headliner and air bag assembly of claim 1, wherein said igniter assembly is disposed between said headliner and a vehicle roof.

14. The headliner and air bag assembly of claim 1, wherein adhesive is provided between said carrier assembly and said headliner for adhesively securing said carrier assembly to said headliner.

15. The headliner and air bag assembly of claim 1, wherein said adhesive tears away from said headliner to allow downward displacement of a peripheral edge of said headliner during deployment of said air curtains.

16. A method of assembling a vehicle headliner and air bag assembly comprising:

providing a plastic carrier assembly including left and right rails and a cross-member;

positioning inflatable air curtains within the left and right rails;

positioning an igniter assembly in the cross-member for inflating the air curtains; and attaching the carrier assembly to a headliner having left and right side edges such that the left and right rails extend along the left and right side edges, and the cross-member connects the left and right rails to structurally support the weight of the headliner and air bag assembly during installation, wherein said attaching step comprises adhesively attaching the carrier assembly to the headliner such that inflation of the air curtains will tear the adhesive attachment along the left and right side edges of the headliner for deployment along side windows of a vehicle in which the assembly is installed.

17. The method of claim 6, further comprising positioning foam countermeasures within the left and right rails prior to said attaching of the carrier assembly to the headliner.

18. The method of claim 16, wherein said attaching step comprises attaching the cross-member along a rear edge of the headliner.

19. The method of claim 16, wherein adhesive is provided between said carrier assembly and said headliner for adhesively securing said carrier assembly to said headliner.

20. The method of claim 16, wherein said adhesive tears away from said headliner to allow downward displacement of a peripheral edge of said headliner during deployment of said air curtains.

* * * * *